United States Patent Office 3,717,796
Patented Feb. 20, 1973

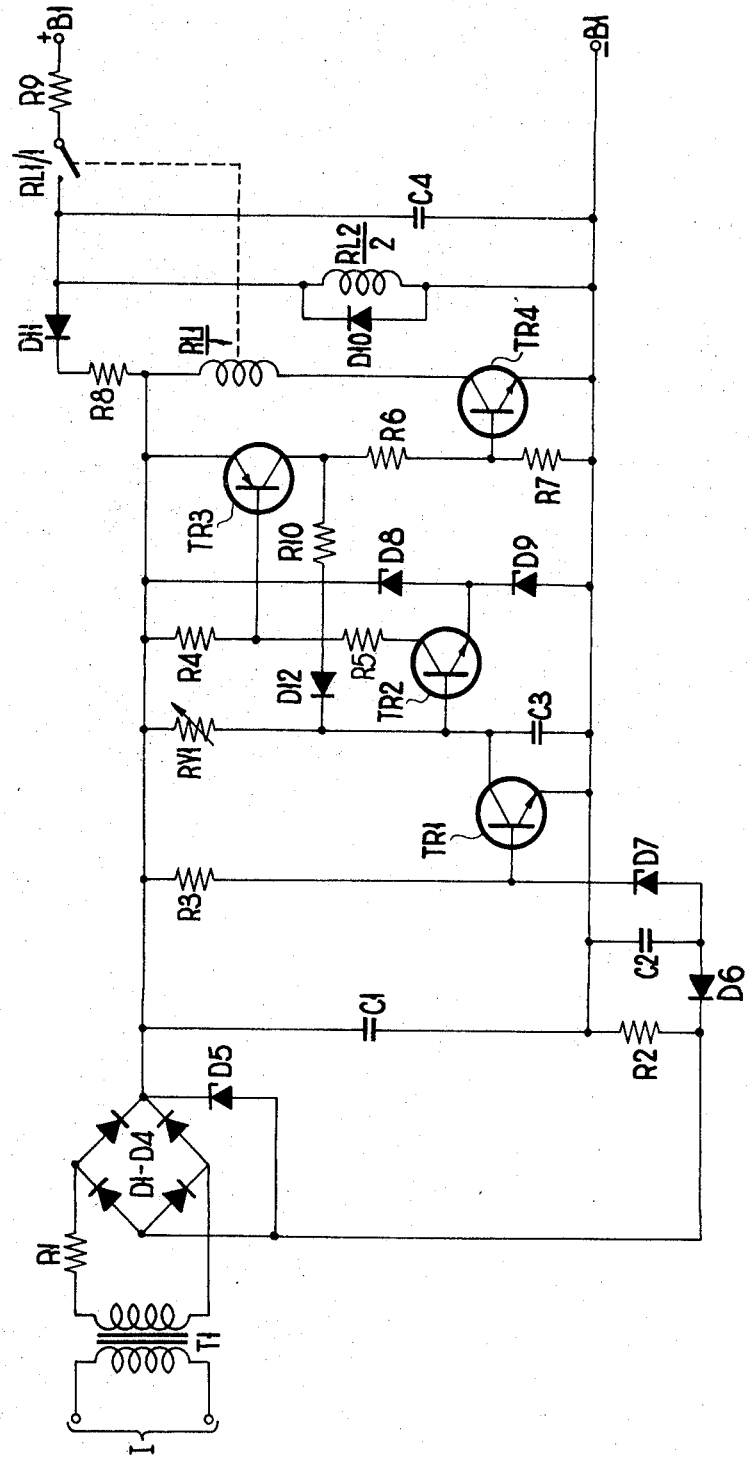

3,717,796
RELAY POWER SUPPLY
Michael Charles Stephen Simpson and Barrie Felton,
Stafford, England, assignors to The English Electric
Company Limited, London, England
Filed Dec. 21, 1970, Ser. No. 99,867
Int. Cl. H01h 47/32
U.S. Cl. 317—148.5 R          4 Claims

ABSTRACT OF THE DISCLOSURE

The invention provides a power supply for a monitoring circuit for an AC transmission system. Such a power supply normally has to provide only a small, continuous current, but occasionally much heavier currents. To eliminate internal batteries, station batteries can be used; but this tends to impose a small but continuous drain on them. By the invention, the signal being monitored is used to provide sufficient power to meet the normal demand of the monitoring circuit, and also to charge a capacitor C1. When relay operation is required, C1 is discharged through coil $$\frac{RL1}{1}$$

of a relay, this being sufficient to energize the coil transiently. This closes a contact RL1/1 which connects the station battery B1 to the monitoring circuit. The monitoring circuit then draws any required power from the station battery, for as long as necessary.

---

The present invention relates to monitoring circuits, and particularly to their power supply arrangements.

Monitoring circuits are known which monitor a signal and also use that signal to provide the power supply for energizing the circuit itself. The monitoring circuit includes static, i.e. transistor, circuitry and the coil of a relay which is energized when the monitored signal exceeds a predetermined value. The power required to operate the relay coil is substantially greater than that required by the static circuitry. The monitored signal thus has to be able to supply sufficient power to operate both the static circuitry and the relay coil, and the circuit which supplies the monitored signal thus has to be able to provide a substantial amount of power, and is therefore unduly costly.

It has been known to overcome this problem by energizing the monitoring circuit instead from an external power source such as a battery. However, this results in a continuous power drain on the battery.

By the present invention, a monitoring circuit includes: an internal power supply circuit fed by the signal being monitored, transistor circuitry for monitoring the signal, a normally unenergized primary relay whose coil is controlled by the transistor circuitry, and a capacitor all connected across the internal power supply circuit, the signal being monitored being too feeble to energize the relay coil but the capacitor storing enough charge to energize it transiently; and a normally open contact of the relay arranged to connect an external power supply in parallel with the internal power supply circuit when the relay is energized.

An embodiment of the invention will now be described, by way of example, with reference to the accompanying circuit diagram of an overcurrent relay.

This circuit monitors a current I applied to the primary of a current transformer T1. The output of this transformer is rectified by a diode bridge D1–D4 and used both as the input to static circuitry TR1–TR4, so that it is duly monitored, and to provide a power supply for static circuitry TR1–TR4 and, in conjunction with a capacitor C1, the primary relay coil $$\frac{RL1}{1}$$

An external power supply, e.g. a battery (not shown) is connected to the terminals B1, which are connected to the static circuitry over a contact RL1/1. An output relay coil $$\frac{RL2}{2}$$

is used to provide the final output signal, operating two contacts (not shown).

Considering the circuit now in more detail, the output from the current transformer T1 is applied to the diode bridge D1–D4 over a resistor R1, and the output of the bridge is limited by a Zener diode D5. This limited output is applied to resistor R2 and capacitor C1 in series, capacitor C1 being shunted by Zener diodes D8 and D9 so that a regulated power supply is obtained. Capacitor C1 smooths this supply, but the transformer and bridge circuit are sufficient to supply any load due to the static part of the circuit without causing a voltage drop.

Since the voltage across C1 is constant, any variations in the input signal appear as corresponding variations in the voltage across resistor R2. This (negative) voltage is rectified and smoothed by a diode D6 and a capacitor C2, and is applied to the lower end of a chain formed by a Zener diode D7 and a resistor R3. In the normal state, i.e. with the input current within its permitted limit, transistor TR1 is held on, clamping its base to its emitter voltage, and the voltage across Zener diode D7 is insufficient to turn this diode on. However, if the input current exceeds its permitted limit, Zener diode D7 is turned on, the voltage on the base of transistor TR1 is taken negative, and this transistor turns off. Capacitor C3, which is normally held discharged by transistor TR1, therefore starts to charge up, and transistor TR2 turns on when the voltage of C3 reaches the voltage at the junction of Zener diodes D8 and D9. This in turn turns on transistors TR3 and TR4, which are normally cut off. Capacitor C3 acts to prevent the circuit from responding when the input current I exceeds the predetermined limit only momentarily.

In order to prevent transistor TR4 from being only partly turned on when the current is just at its permitted limit, with consequent possible draining of capacitor C1, transistors TR2 and TR3 are converted into a trigger circuit by a feedback path between the collector of TR3 and the base of TR2. The feedback path consists of resistor R10 and diode D12 connected in series. This feedback path is not essential, and can be omitted if desired.

When transistor TR4 turns on, relay coil $$\frac{RL1}{1}$$

of low resistance is thereby connected across the capacitor C1. The energy stored by C1 is initially sufficient to energize this coil, but C1 will discharge through the coil and its energization will be transient; the power supply from the input current I is insufficient to maintain C1 charged under this condition. However, the energization of coil $$\frac{RL1}{1}$$

closes contact RL1/1, connecting the external power supply at terminals B1 to the monitoring circuit through resistor R8; resistor R9 and capacitor C4 serve to filter out any voltage spikes which may appear on this power supply. This external power supply is sufficient to hold coil $\frac{RL1}{1}$ energized for as long as transistor TR4 is on, thus holding itself latched on.

The external power supply B1 is also applied across the coil $\frac{RL2}{2}$ of the output relay whose two contacts (not shown) operate associated circuitry (not shown) on the detection of an overcurrent, i.e. on the current signal I exceeding the limit defined by the Zener diode D7. Diode D11 isolates the battery B1 and the relay coil $\frac{RL2}{2}$ from the power supply obtained from the input current I.

We claim:

1. A signal monitoring circuit comprising: transistor circuitry for monitoring the signal having a first input to which the signal to be monitored is applied and a second input to which the energy required to energize the transistor circuitry is applied; a capacitor; an internal power supply circuit connected across the second input of the transistor circuitry and the capacitor for deriving from the signal being monitored electrical energy required to energize the transistor circuitry and charge the capacitor; a normally unenergized primary relay whose relay coil is connected across the capacitor by the transistor circuitry in response to a predetermined condition of the signal being monitored, the signal being monitored being too feeble to energize the relay coil but the capacitor storing enough charge to energize the relay transiently; an external power supply; and a normally open contact on the relay arranged to connect the external power supply in parallel with the internal power supply when the relay is energized so that thereafter the relay coil is energized from the external power supply under control of the transistor circuitry for so long as the signal being monitored has said predetermined condition.

2. A monitoring circuit according to claim 1, wherein a diode is connected between the primary relay contact and the transistor circuitry, primary relay coil, and the capacitor, and an output relay has its coil connected across the power supplies on the side of the diode remote from the internal power supply circuit, so that it is energized when the contact of the primary relay is closed.

3. A monitoring circuit according to claim 1, wherein the transistor circuitry is responsive to the signal being monitored exceeding a predetermined amplitude.

4. A monitoring circuit according to claim 2, wherein the transistor circuitry is responsive to the signal being monitored exceeding a predetermined amplitude.

References Cited
UNITED STATES PATENTS

| | | | |
|---|---|---|---|
| 3,157,829 | 11/1964 | Wood | 317—151 |
| 3,320,493 | 5/1967 | Culbertson | 317—DIG. 5 |
| 3,213,321 | 10/1965 | Dalziel | 317—151 |
| 3,312,875 | 4/1967 | Mayer | 317—151 |

L. T. HIX, Primary Examiner

U.S. Cl. X.R.

317—151, DIG. 5